3,355,282
ALLOYS OF ALUMINUM-CADMIUM-COPPER
Shiro Kudo, Sakai-shi, Seiichi Yada, Ube-shi, and Takayuki Yamauchi and Eiichi Fukasaku, Sakai-shi, Japan, assignors to Kyowa Hakko Kogyo Co., Ltd., Tokyo, Japan, a corporation of Japan
No Drawing. Filed June 7, 1965, Ser. No. 462,041
Claims priority, application Japan, June 10, 1964, 39/32,583
3 Claims. (Cl. 75—139)

The present invention relates to catalytic dehydrogenation, and more particularly, catalytic hydrogenation wherein the catalyst is prepared by treating a ternary alloy of copper, cadmium and aluminum with an alkali.

In the co-pending applications claiming Convention priority based on Japanese application Nos. 37/16,744, 38/29,271 and 39/53,896 respectively, new catalysts are provided for the production of $\alpha,\beta$-unsaturated alcohols by selective hydrogenation of $\alpha,\beta$-unsaturated carbonyl compounds and also for the production of unsaturated higher aliphatic alcohols by hydrogenation of unsaturated fatty acids and of unsaturated fatty acid esters.

The present inventors have conducted studies on dehydrogenation of alcohols to produce the corresponding ketones, and have found the similar catalyst is also useful for the present purpose. The catalyst is prepared likewise by the method described in the above copending application, except that the starting mixture contains from 30 to 70% by weight of aluminum, the remainder being cadmium and copper and the cadmium content is about 0.5 to about 15% by weight of said remainder and the copper content is from about 85 to about 99.5% by weight of the remainder.

In regard to the preparation of cyclohexanone by the dehydrogenation of cyclohexanol, various catalysts have been studied for a long time. Thus, many studies on precipitated copper catalysts [such as, for example, "Kogyo Kagaku Zasshi," vol. 46, 903 (1943), "Nihon Kagaku Zasshi," vol. 80, 681 (1959), etc.], copper base alloy catalysts [such as, for example, "Yuki Kagobutsu Goseiho (Processes for Synthesizing Organic Compound), vol. 4, 32 (1951), U.S. Patent No. 2,338,445, etc.] and zinc-iron alloy catalysts [such as, for example, "Kogyo Kagaku Zasshi," vol. 65, 1534 (1962)] have been heretofore published. Precipitates catalysts have a relatively high activity, if they are suitably prepared, and may provide a considerably high conversion rate at a reaction temperature from 300° to 350° C. However, these catalysts have defects in that they lack in a mechanical strength and their catalyst life is rather short. On the other hand, alloy catalysts have many defects in that the practical reaction temperature is very high (such as from 400° to 500° C.), because the catalysts have a low activity, and a large quantity of by-products may be formed. Relatively little work has been done on the use of a Raney type catalyst in the dehydrogenation reaction; however, work on the use of a Raney copper catalyst in such reaction has been reported in the Proceedings of the International Congress on Catalysis, Paris (1960), etc. Sato et al. reported that a Raney type copper-zinc catalyst with or without small amounts of nickel, cobalt or the like was effective in the dehydrogenation reaction [cf. "Shokubai (Catalyst)," vol. 3, 26 (1961)]. Generally Raney type catalysts have a superior activity at a low temperature and have a superior mechanical strength compared with those prepared by other processes, but have a defect in that their life is unsatisfactory as industrial catalysts.

The present invention obviates the above-mentioned disadvantages of known catalysts by providing a Raney type copper-cadmium catalyst having an excellent catalytic activity as an industrial catalyst in dehydrogenation reactions. Thus, while a Raney type copper-cadmium catalyst may have a good activity at the start of the reaction at relatively low temperature as do the known copper-base Raney type catalysts, the present catalysts are distinguished from hitherto-known Raney type catalysts in that the durability of the new catalysts is extremely excellent as evidenced in the later mentioned examples and the reduction of catalytic activity caused by the continuation of the reaction is extremely small, and thus a dehydrogenation reaction may be continued with a good yield over a long period of time.

Thus, an object of the present invention is to provide the catalytic dehydrogenation of alcohol to produce the corresponding ketone in an economically feasible manner and another object is to provide the catalytic dehydrogenation of cyclohexanol to produce cyclohexanone. Other objects are apparent from the following description.

The ternary alloy of copper-cadmium-aluminum employed in the present invention can be prepared similarly as described in copending applications claiming Convention priority based on Japanese applications Nos 37/16,744, 38/29,271 and 39/53,896 respectively, for example, as follows:

The alloy is prepared in a graphite crucible in an electric furnace, and, in this case, for easier preparation of the ternary alloy of a definite composition, it is convenient preliminarily to prepare binary alloys of copper-aluminum and copper-cadmium of definite compositions, and then to prepare the ternary alloy from these mother alloys. The resultant molten ternary alloy of definite composition is poured out onto a floor from the graphite crucible, and rapidly cooled, and then crushed.

The proportion of the component metals in the ternary alloy is suitably from 30 to 70 percent by weight of aluminum, the remainder being copper and cadmium, and the proportion of cadmium in the remainder of copper and cadmium is from 0.5 to 15 percent by weight of said remainder.

The aluminum is dissolved out from the ternary alloy with an alkali as in the case of a general Raney type catalyst. The composition of the thus obtained Raney type catalyst contains 1 to 60 percent by weight of aluminum and a remainder of cadmium and copper, with cadmium being 0.5 to 15% by weight of this remainder. The surface area of the catalyst ranges from 5 to 70 square meters per gram (m.²/g.).

The following illustrative examples of presently preferred embodiments will serve to illustrate this invention.

EXAMPLE 1

A graphite crucible is heated to about 700° C. in an electric furnace. 188 grams of a binary alloy block of aluminum and copper (41:53 by weight) is placed in said heated crucible to be melted. Thereafter 12 grams of a binary alloy block of cadmium and copper (1:1 by weight) is charged thereinto with sufficient agitation. The contents are poured out onto a floor while thoroughly stirring with a silica rod, and rapidly cooled with water and then crushed into particles of the size of several millimeters.

When 44 grams of said alloy are treated with 1 kilogram of an aqueous 5% caustic soda solution at a temperature from 100° to 101° C. for 1 hour, about 70 percent of the aluminum in said alloy is dissolved out. The resulting catalyst is washed with water, and packed in a wet state into a reaction tube.

Thus, e.g. the catalyst is packed into the central section of a reaction tube having an inside diameter of 25 millimeters and a length of 800 millimeters. Cyclohexanol is passed to the catalyst layer through a preheater section provided above the catalyst layer and the reaction products are collected in a receiver through a condenser. The composition of the collected reaction products is deter-

TABLE 1

| Reaction temperature (°C.) | Feed Rate of cyclohexanol (cc./hr. at 20° C.) | Liquid space velocity (cc./hr. cc. catalyst) | Composition of Reaction Products (percent by weight) | | | |
|---|---|---|---|---|---|---|
| | | | Cyclohexanone | Unreacted cyclohexanol | Low boiling point by-product | High boiling point by-product |
| 275 | 40 | 20 | 73.6 | 25.2 | 0.2 | 1.0 | mined by a combination of gas chromatography and chemical analysis.

The result of the reaction carried out in the above-mentioned manner is shown in the above table:

EXAMPLE 2

The result of a run on a ternary alloy of copper, cadmium and aluminum having a different composition according to the procedure shown in Example 1 is summarized in the following table.

Composition of the alloy material (percent by weight)—
Copper:cadmium:aluminum=44.6:0.4:55.0.
Elution percent of aluminum from the alloy material—
70 percent.

TABLE 2

| Reaction temperature (°C.) | Feed Rate of cyclohexanol (cc./hr. at 20° C.) | Liquid space velocity (cc./hr. cc. catalyst) | Composition of Reaction Products (percent by weight) | | | |
|---|---|---|---|---|---|---|
| | | | Cyclohexanone | Unreacted cyclohexanol | Low boiling point by-product | High boiling point by-product |
| 300 | 78 | 3.9 | 72.7 | 25.5 | 0.4 | 1.4 |

EXAMPLE 3

In this example, the life of a Raney type copper-cadmium catalyst in accordance with the third aspect of the present invention is compared with that of prior known Raney type catalysts. Each of the three kinds of alloy materials specified below is employed in the form of a block having a size from 4 to 5 millimeters. The reactor employed is the same as shown in Example 1. 44 grams of each of said catalysts is packed into the reactor.

The alkali treatment is also carried out on each of said alloys at a temperature from 100° to 101° C. with one kilogram of 5% aqueous caustic soda per 44 grams of alloy until the elution percent of aluminum from the alloy material is 70 percent, as shown in Example 1.

*Composition of the alloy material*

A. Copper:cadmium:aluminum—44.5:5.3:50.2
B. Copper:zinc:aluminum—47.6:5.0:47.4
C. Copper:aluminum—50.1:49.9

*Reaction conditions*

Reaction temperature _____ 300° C.
Feed rate of cyclohexanol (at 20° C.) _____ 80 cc./hr.
L.S.V. (at 20° C.) _____ 4 cc./hr. cc. catalyst.

*Results*

A. Raney type copper-cadmium catalyst:

TABLE 3

| Reaction continuation time (hr.) | Composition of Reaction Products (percent by weight) | | | |
|---|---|---|---|---|
| | Cyclohexanone | Unreacted cyclohexanol | Low boiling point by-product | High boiling point by-product |
| 10 | 73.5 | 24.4 | 0.3 | 1.8 |
| 30 | 71.8 | 26.5 | 0.5 | 1.2 |
| 50 | 69.5 | 28.4 | 1.0 | 1.1 |
| 150 | 64.2 | 33.1 | 1.3 | 1.4 |
| 300 | 60.1 | 37.1 | 1.7 | 1.1 |

B. Raney type copper-zinc catalyst:

TABLE 4

| Reaction continuation time (hr.) | Composition of Reaction Products (percent by weight) | | | |
|---|---|---|---|---|
| | Cyclohexanone | Unreacted cyclohexanol | Low boiling point by-product | High boiling point by-product |
| 10 | 72.8 | 23.0 | 0.3 | 3.9 |
| 30 | 53.4 | 41.9 | 1.2 | 3.5 |
| 50 | 24.3 | 72.8 | 0.9 | 2.0 |

C. Raney type copper catalyst:

TABLE 5

| Reaction continuation time (hr.) | Composition of Reaction Products (percent by weight) | | | |
|---|---|---|---|---|
| | Cyclohexanone | Unreacted cyclohexanol | Low boiling point by-product | High boiling point by-product |
| 10 | 68.8 | 27.1 | 0.5 | 3.6 |
| 30 | 33.0 | 64.0 | 0.7 | 2.3 |
| 50 | 7.7 | 89.1 | 0.9 | 2.3 |

What we claim is:

1. Ternary alloy consisting essentially of aluminum, cadmium and copper, and containing Parts by weight
Aluminum _____ 24.6
Cadmium _____ 6
Copper _____ 112

2. Ternary alloy consisting essentially of aluminum, cadmium and copper, and containing Parts by weight
Aluminum _____ 55.0
Cadmium _____ 0.4
Copper _____ 44.6

3. Ternary alloy consisting essentially of aluminum, cadmium and copper, and containing Parts by weight
Aluminum _____ 50.2
Cadmium _____ 5.3
Copper _____ 44.5

References Cited

UNITED STATES PATENTS 2,046,145  6/1936  Arnold _____ 260—596 XR

OTHER REFERENCES

Ohta et al.: "Japan Govt. Chem., Ind. Research Inst.," vol. 48, pp. XIII, XIV, XX, XXV and XXVI (1953).

DAVID L. RECK, *Primary Examiner.*

BERNARD HELFIN, RICHARD O. DEAN,
*Examiners.*

M. JACOBS, *Assistant Examiner.*